(12) United States Patent
Doura et al.

(10) Patent No.: US 9,181,386 B2
(45) Date of Patent: Nov. 10, 2015

(54) POLISHING PAD, MANUFACTURING METHOD THEREFOR, AND METHOD FOR MANUFACTURING A SEMICONDUCTOR DEVICE

(75) Inventors: Masato Doura, Osaka (JP); Nobuyoshi Ishizaka, Osaka (JP)

(73) Assignee: Toyo Tire & Rubber Co., Ltd., Osaka-shi (JP)

( * ) Notice: Subject to any disclaimer, the term of this patent is extended or adjusted under 35 U.S.C. 154(b) by 321 days.

(21) Appl. No.: 13/634,218

(22) PCT Filed: Mar. 17, 2011

(86) PCT No.: PCT/JP2011/056455
§ 371 (c)(1),
(2), (4) Date: Sep. 11, 2012

(87) PCT Pub. No.: WO2011/118505
PCT Pub. Date: Sep. 29, 2011

(65) Prior Publication Data
US 2013/0035021 A1    Feb. 7, 2013

(30) Foreign Application Priority Data

Mar. 26, 2010   (JP) ................................. 2010-072948

(51) Int. Cl.
| | | |
|---|---|---|
| C08G 18/28 | (2006.01) | |
| C08G 18/79 | (2006.01) | |
| C08G 18/42 | (2006.01) | |
| C08G 18/48 | (2006.01) | |
| C08G 101/00 | (2006.01) | |

(52) U.S. Cl.
CPC .......... *C08G 18/797* (2013.01); *C08G 18/2835* (2013.01); *C08G 18/4277* (2013.01); *C08G 18/4854* (2013.01); *C08G 2101/0025* (2013.01)

(58) Field of Classification Search
CPC .......... C08G 18/2835; C08G 18/4277; C08G 18/4854; C08G 18/797; C08G 2101/0025
USPC ...................... 521/116, 117, 170, 174; 451/41
See application file for complete search history.

(56) References Cited

U.S. PATENT DOCUMENTS

| | | | | |
|---|---|---|---|---|
| 3,152,162 A | * | 10/1964 | Fischer et al. ................. | 560/334 |
| 4,513,124 A | * | 4/1985 | Hoffman ........................ | 525/452 |
| 4,950,694 A | * | 8/1990 | Hager .......................... | 521/167 |
| 5,124,368 A | * | 6/1992 | Gill et al. ..................... | 521/111 |
| 5,539,011 A | * | 7/1996 | Hilker et al. .................. | 521/163 |
| 7,202,385 B2 | * | 4/2007 | Mueller et al. ................ | 568/679 |
| 7,262,227 B2 | * | 8/2007 | Shibanuma et al. .......... | 521/130 |
| 2004/0121714 A1 | | 6/2004 | Horie et al. | |
| 2005/0043422 A1 | * | 2/2005 | Shibanuma et al. .......... | 521/155 |
| 2005/0064709 A1 | | 3/2005 | Shimomura et al. | |
| 2005/0070619 A1 | * | 3/2005 | Miller .......................... | 521/114 |
| 2006/0037699 A1 | * | 2/2006 | Nakamori et al. ........ | 156/345.12 |
| 2006/0229000 A1 | | 10/2006 | Izumi et al. | |
| 2006/0270328 A1 | | 11/2006 | Horie et al. | |
| 2006/0280929 A1 | * | 12/2006 | Shimomura et al. ........ | 428/304.4 |
| 2006/0280930 A1 | | 12/2006 | Shimomura et al. | |
| 2008/0085943 A1 | | 4/2008 | Doura et al. | |
| 2008/0148649 A1 | | 6/2008 | Liu | |
| 2008/0153395 A1 | | 6/2008 | Kulp et al. | |
| 2010/0035529 A1 | | 2/2010 | Kulp et al. | |
| 2010/0247868 A1 | | 9/2010 | Cha et al. | |
| 2010/0317263 A1 | * | 12/2010 | Hirose et al. ..................... | 451/41 |
| 2012/0322348 A1 | | 12/2012 | Yokoi et al. | |

FOREIGN PATENT DOCUMENTS

| | | |
|---|---|---|
| JP | 2000-17252 | 1/2000 |
| JP | 2001-172359 | 6/2001 |
| JP | 3359629 | 12/2002 |
| JP | 2003-37089 A | 2/2003 |
| JP | 2004-136432 | 5/2004 |
| JP | 2006-110665 | 4/2006 |
| JP | 2006-206625 | 8/2006 |
| JP | 2006-297582 | 11/2006 |
| JP | 2006-334745 | 12/2006 |
| JP | 2008-168422 | 7/2008 |
| JP | 2010-58220 | 3/2010 |
| JP | 2010-058220 | 3/2010 |
| JP | 2010-064153 | 3/2010 |
| JP | 2010-64153 | 3/2010 |
| JP | 2010-240769 | 10/2010 |
| TW | 200837181 | 9/2008 |
| TW | 200942557 | 10/2009 |
| TW | 201006854 | 2/2010 |
| TW | 201041952 | 12/2010 |
| TW | 201130871 | 9/2011 |
| WO | WO2009113399 | * 9/2009 |

OTHER PUBLICATIONS

Notification of the First Office Action dated Apr. 1, 2014, directed to CN Application No. 201180011398.3; 20 pages.

(Continued)

*Primary Examiner* — John Cooney
(74) *Attorney, Agent, or Firm* — Morrison & Foerster LLP

(57) ABSTRACT

A polishing pad having a polishing layer comprising a thermoset polyurethane foam, wherein the thermoset polyurethane foam contains, as raw material components, an isocyanate component, and active-hydrogen-containing compounds, and the active-hydrogen-containing compounds comprise one or more polyol compounds (each) having two or more functional groups, and a monool compound having one functional group.

8 Claims, 1 Drawing Sheet

(56) References Cited

OTHER PUBLICATIONS

Office Action received Jan. 23, 2014, directed to TW Application No. 100109873; 10 pages.
Notification of Reasons for Refusal mailed Oct. 25, 2013, directed to JP Application No. 2010-072948; 5 pages.
Search Report mailed Jun. 7, 2011 directed towards international application No. PCT/JP2011/056455; 2 pages.
Notice to Submit a Response dated Nov. 27, 2013, directed to KR Application No. 10-2012-7022940; 8 pages.
Office Action received Nov. 6, 2014, directed to TW Application No. 101131997; 14 pages.
Official Letter dated May 2, 2014, directed to TW Application No. 101131997; 13 pages.
International Search Report dated Sep. 25, 2012, directed to International Application No. PCT/JP2012/071473; 2 pages.
International Preliminary Report on Patentability mailed Apr. 3, 2014, directed to International Application No. PCT/JP2012/071473; 5 pages.
First Office Action mailed Aug. 6, 2015, directed to TW Application No. 101131997, 8 pages.

\* cited by examiner

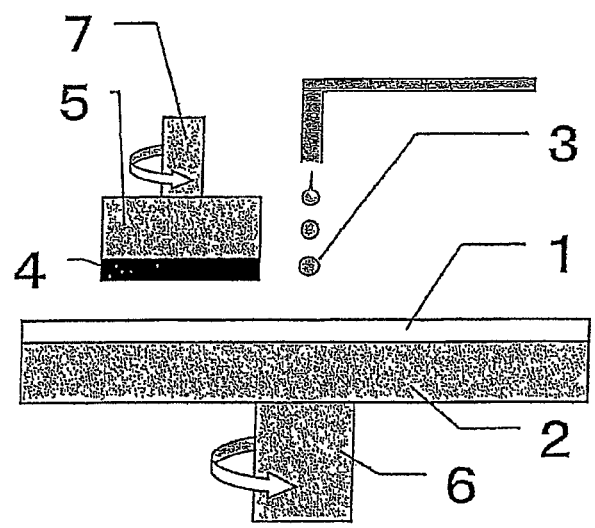

POLISHING PAD, MANUFACTURING METHOD THEREFOR, AND METHOD FOR MANUFACTURING A SEMICONDUCTOR DEVICE

REFERENCE TO RELATED APPLICATIONS

This application is a national stage application under 35 USC 371 of International Application No. PCT/JP2011/056455, filed Mar. 17, 2011, which claims the priority of Japanese Patent Application No. 2010-072948, filed Mar. 26, 2010, the entire contents of which are incorporated herein by reference.

FIELD OF THE INVENTION

The present invention relates to a polishing pad capable of attaining, with a stable and high polishing efficiency, a planarization processing of an optical matter or a silicon wafer such as a lens or a reflecting mirror, a glass substrate or aluminum substrate for a hard disc, and a matter or material for which a high-level surface flatness is required in, for example, an ordinary metal polishing processing; a method for manufacturing the same; and a method for manufacturing a semiconductor device. The polishing pad of the present invention is particularly useful for finish polishing of a silicon wafer or a glass piece.

BACKGROUND OF THE INVENTION

In general, the mirror polishing of a semiconductor wafer such as a silicon wafer, a lens, a glass substrate, or some other is divided to rough polishing for a main purpose of adjusting the polished matter in flatness and in-plane evenness, and finish polishing for a main purpose of improving the matter in surface roughness, and removing scratches.

The finish polishing is usually attained by causing sueded artificial leather made of a soft foamed polyurethane to adhere onto a rotatable table, and rubbing a wafer against the leather while a polishing agent wherein colloidal silica is contained in an aqueous
s alkali-based solution is supplied thereonto (Patent Document 1).

However, when the polishing layer, which is made of the foamed polyurethane used for finish polishing, is low in flatness, there is caused a problem that tiny undulations are generated in the surface of the matter to be polished. The tiny undulations have been in particular considered to be a problem in the field of recent finish polishing. Thus, it has been intensely required in the market to supply a polishing pad capable of attaining a further decrease of tiny undulations.

Patent Document 2 listed up below describes a polishing cloth, for decreasing tiny undulations generated in the surface of a matter to be polished, wherein a polyurethane foam is arranged for a surface layer. However, this document never describes any specific formulation or composition of the polyurethane foam, or any matter related thereto. Furthermore, the cloth has a room for a further improvement from the viewpoint of the effect of decreasing the tiny undulations.

Patent Document 1: JP-A-2003-37089
Patent Document 2: JP-A-2004-136432

SUMMARY OF THE INVENTION

In light of the above-mentioned actual situation, the present invention has been made, and an object thereof is to provide a polishing pad capable of decreasing tiny undulations generated in the surface of a matter to be polished, a method for manufacturing the same, and a method for manufacturing a semiconductor device.

In order to solve the problems, the inventors have made eager investigations to find out that the object can be attained by a polishing pad described below. Thus, the present invention has been accomplished.

Accordingly, the polishing pad of the present invention is a polishing pad having a polishing layer comprising a thermoset polyurethane foam, wherein the thermoset polyurethane foam contains, as raw material components, an isocyanate component, and active-hydrogen-containing compounds, and the active-hydrogen-containing compounds comprise one or more polyol compounds (each) having two or more functional groups, and a monool compound having one functional group.

In the polishing pad according to the present invention, its polishing layer is made of a thermoset polyurethane foam, and the foam contains, as raw material components thereof, one or more polyol compounds (each) having two or more functional groups, and a monool compound having one functional group. The polishing pad having this structure makes it possible to exhibit endurance based on the thermoset polyurethane foam while tiny undulations generated in the surface of a matter to be polished are decreased since the foam comprises the one-functional-group-containing monool compound.

In the polishing pad, the monool compound is preferably a compound represented by the following general formula (1):

$$R^1-(OCH_2CHR^2)_n-OH \quad (1)$$

wherein $R^1$ is a methyl or ethyl group, $R^2$ is a hydrogen atom, or a methyl group, and n is an integer of 1 to 5. The polishing pad having this structure makes it possible to attain a further decrease of tiny undulations generated in the surface of a matter to be polished.

In the polishing pad, it is preferred that the monool compound is contained in an amount of 1 to 20 parts by weight for 100 parts by weight of the polyol compound(s). When the content of the monool compound is adjusted into this range, tiny undulations generated in the surface of a matter to be polished can be decreased while the hardness of the polishing layer is maintained.

In the polishing pad, it is preferred that one or more polyol compounds (each) having 3 or 4 functional groups and a hydroxyl group value of 100 to 1,900 mg KOH/g are comprised in an amount of 20 to 75 parts by weight for 100 parts by weight of the polyol compounds. In general, when a thermoset polyurethane foam contains, as a raw material thereof, a monool compound having one functional group, the polyurethane is low in molecular weight so that the polishing layer is low in hardness. Thus, the polishing pad tends to be deteriorated in polishing characteristics such as polishing rate. By contrast, when the content of the above-mentioned polyol compound(s) is adjusted into the range, tiny undulations generated in the surface of a matter to be polished can be decreased while the hardness of the polishing layer is maintained.

In the polishing pad, the isocyanate component is preferably an aromatic isocyanate, and is more preferably a carbodiimide-modified diphenylmethane diisocyanate. When a substrate layer is laminated onto the polishing layer, the use of the active-hydrogen-containing compounds together with the carbodiimide-modified MDI attains a remarkable improvement in the adhesiveness between the polishing layer and the substrate layer.

In the polishing pad, it is preferred that the thermoset polyurethane foam has substantially spherical bubbles having an average bubble diameter of 20 to 300 μm. When the polishing layer is formed by use of the thermoset polyurethane foam, which has substantially spherical bubbles having an average bubble diameter of 20 to 300 μm, the polishing layer can be improved in endurance. Thus, when the polishing pad of the present invention is used, the polishing pad can keep high planarization characteristics over a long term, and is also improved in polishing rate stability. The wording "substantially spherical" denotes a spherical form and an elliptic form. Bubbles in an elliptic form denote bubbles having a ratio between the long diameter L and the short diameter S (ratio of L/S) of 5 or less, preferably 3 or less, more preferably 1.5 or less.

The present invention also relates to a method for manufacturing a polishing pad, comprising the step of using a mechanical foaming method to prepare a foam-dispersed urethane composition containing, as raw material components, active-hydrogen-containing compounds comprising a polyol compound having two or more functional groups and a monool compound having one functional group, and an isocyanate component; the step of painting the foam-dispersed urethane composition onto a planar member; the step of setting the foam-dispersed urethane composition to form a polishing layer comprising a thermoset polyurethane foam having substantially spherical bubbles having an average bubble diameter of 20 to 300 μm; and the step of adjusting the polishing layer into a uniform thickness. This manufacturing method makes it possible to manufacture a polishing pad capable of decreasing tiny undulations generated in the surface of a matter to be polished.

Furthermore, the present invention relates to a method for manufacturing a semiconductor device, comprising the step of using the polishing pad described in any one of the above-mentioned paragraphs concerned to polish a surface of a semiconductor wafer.

BRIEF DESCRIPTION OF THE DRAWING

FIG. 1 is a schematic structural view illustrating a polishing machine used in a method for manufacturing a semiconductor device.

DETAILED DESCRIPTION OF THE INVENTION

The polishing pad of the present invention has a polishing layer made of a thermoset polyurethane foam, which may be referred to as a "polyurethane foam" hereinafter.

Polyurethane resin is excellent in abrasion resistance, and can be a polymer that can easily obtained with various physical properties by changing the composition of raw materials thereof variously; and further therein, substantially spherical fine bubbles can easily be formed by a mechanical foaming method (examples thereof including a mechanical frothing method). For these reasons, polyurethane resin is a material particularly preferable for the constituting material of the polishing layer.

Polyurethane resin is a polymer yielded from an isocyanate component, and active-hydrogen-containing compounds (such as a polyol compound having two or more functional groups, a monool compound having one functional group, and a polyamine compound) as raw material components.

As the isocyanate component, any compound known in the field of polyurethane may be used without especial restriction. Examples thereof include aromatic diisocyanates such as 2,4-toluene diisocyanate, 2,6-toluene diisocyanate, 2,2'-diphenylmethane diisocyanate, 2,4'-diphenylmethane diisocyanate, 4,4'-diphenylmethane diisocyanate, polymeric MDI, carbodiimide-modified MDI (for example, MILLIONATE MTL (trade name) manufactured by Nippon Polyurethane Industry Co., Ltd.), 1,5-naphthalene diisocyanate, p-phenylene diisocyanate, m-phenylene diisocyanate, p-xylylene diisocyanate, and m-xylylene diisocyanate; aliphatic diisocyanates such as ethylene diisocyanate, 2,2,4-trimethylhexamethylene diisocyanate, and 1,6-hexamethylene diisocyanate; and alicyclic diisocyanates such as 1,4-cyclohexane diisocyanate, 4,4'-dicyclohexylmethane diisocyanate, isophorone diisocyanate, and norbornane diisocyanate. These may be used alone or in combination of two or more thereof.

Of the above-mentioned isocyanate components, an aromatic diisocyanate is preferably used, and carbodiimide-modified MDI is in particular preferably used.

The polyol compound(s) (each) having two or more functional groups may (each) be one usable ordinarily in technical fields of polyurethane. Examples thereof include any polyether polyol, typical examples thereof including polytetramethylene ether glycol, and polyethylene glycol; any polyester polyol, a typical example thereof including polybutylene adipate; any polyester polycarbonate polyol, examples thereof including polycaprolactone polyol, and a reaction material made from a polyester glycol, such as polycaprolactone, and an alkylene carbonate; any polyester polycarbonate polyol yielded by causing ethylene carbonate to react with a polyhydric alcohol, and next causing the resultant reaction mixture to react with an organic dicarboxylic acid; any polycarbonate polyol yielded by transesterification reaction between a polyhydroxy compound and an aryl carbonate; and any polymer polyol that is a polyether polyol wherein polymer particles are dispersed. These may be used alone or in combination of two or more thereof.

In the present invention, the following may be contained as the polyol compound(s) (each) having two or more functional groups: trimethylolpropane, glycerin, diglycerin, 1,2,6-hexanetriol, triethanolamine, pentaerythritol, tetramethylolcyclohexane, methylglucoside, alkylene oxide (such as EO or PO) adducts of these examples, ethylene glycol, 1,2-propylene glycol, 1,3-propylene glycol, 1,2-butanediol, 1,3-butanediol, 1,4-butanediol, 2,3-butanediol, 1,6-hexanediol, neopentylglycol, 1,4-cyclohexanedimethanol, 3-methyl-1,5-pentanediol, diethylene glycol, triethylene glycol, any other low-molecular-weight polyol, monoethanolamine, diethanolamine, 2-(2-aminoethylamino)ethanol, monopropanolamine, and any other alcoholamine. These may be used alone or in combination of two or more thereof.

In the present invention, a chain extender may be contained as (one of) the polyol compound(s) (each) having two or more functional groups. The chain extender is an organic compound having at least two active hydrogen groups. Examples of the active hydrogen groups include hydroxyl groups, primary or secondary amino groups, and thiol groups (SH). Specific examples of the chain extender include 4,4'-methylenebis(o-chloroaniline) (MOCA), 2,6-dichloro-p-phenylenediamine, 4,4'-methylenebis(2,3-dichloroaniline), 3,5-bis(methylthio)-2,4-toluenediamine, 3,5-bis(methylthio)-2,6-toluenediamine, 3,5-diethyltoluene-2,4-diamine, 3,5-diethyltoluene-2,6-diamine, trimethylene glycol-di-p-aminobenzoate, 1,2-bis(2-aminophenylthio)ethane, 4,4'-diamino-3,3'-diethyl-5,5'-dimethyldiphenylmethane, N,N'-di-sec-butyl-4,4'-diaminodiphenylmethane, 3,3'-diethyl-4,4'-diaminodiphenylmethane, m-xylylenediamine, N,N'-di-sec-butyl-p-phenylenediamine, m-phenylenediamine, p-xylylenediamine, and other polyamines; and the above-mentioned low-molecular-weight polyols or low-molecular-weight polyamines. These may be used alone or in combination of two or more thereof.

When the total amount of the polyol compound(s) is regarded as 100 parts by weight in the present invention, it is preferred that one or more polyol compounds (each) having 3 or 4 functional groups and a hydroxyl group value of 100 to 1,900 mg KOH/g are contained in an amount of 20 to 75 parts by weight. In the present invention, it is important that the one-functional-group-containing monool compound is contained as one of the raw materials of the thermoset polyurethane foam; and further when the polyol compound(s) is/are contained in an amount in this range, tiny undulations generated in the surface of a matter to be polished can be decreased while the hardness of the polishing layer is maintained.

The one-functional-group-containing monool compound may be any one known in technical fields of polyurethane. In the case of using, in particular, a compound represented by the following general formula (1):

$$R^1-(OCH_2CHR^2)_n-OH \qquad (1)$$

wherein $R^1$ is a methyl or ethyl group, $R^2$ is a hydrogen atom, or a methyl group, and n is an integer of 1 to 5 in the present invention, a further decrease of tiny undulations generated in the surface of a matter to be polished can be attained. Specific examples of the monool compound usable in the present invention include diethylene glycol monoethyl ether, diethylene glycol monomethyl ether, dipropylene glycol monoethyl ether, dipropylene glycol monomethyl ether, 2-methoxyethanol, ethylene glycol monoethyl ether, ethylene glycol monobutyl ether, ethylene glycol mono-t-butyl ether, ethylene glycol monophenyl ether, diethylene glycol monobutyl ether, triethylene glycol monobutyl ether, and polyethylene glycol mono-p-isooctylphenyl ether; and any alkylene oxide adduct of a carboxylic acid such as acetic acid, acrylic acid or methacrylic acid.

In the present invention, a polyamine compound may be contained as one of the active-hydrogen-containing compounds. Examples of the polyamine compound include ethylenediamine, tolylenediamine, diphenylmethanediamine, and alkylene oxide (such as EO or PO) adducts of these amines. These may be used alone or in combination of two or more thereof. It is particularly preferred to use an EO adduct of ethylenediamine.

For the production of the polyurethane resin, either a prepolymer method or one-shot method may be used. When the polyurethane resin is produced by a prepolymer method, a chain extender is used to cure an isocyanate-terminated prepolymer. As the chain extender, any one of the above-mentioned chain extenders may be used.

The ratio between the isocyanate component and the active-hydrogen-containing compounds may be variously changed in accordance with the molecular weight of each of these materials, desired physical properties of the polyurethane foam, and others. In order to give a foam having desired properties, the following index is preferably from 0.80 to 1.20, more preferably from 0.90 to 1.15: the number (NCO index) of isocyanate groups of the isocyanate component relative to the number of entire active hydrogen groups (hydroxyl groups+amino groups) of the active-hydrogen-containing compounds. If the number of the isocyanate groups is out of this range, the resultant polyurethane tends to undergo curing insufficiency not to gain a required specific gravity, hardness, compressibility nor some other property.

The polyurethane resin may be produced by a known urethanizing technique such as melting technique or solution technique. When cost, working environment and others are considered, it is preferred to produce the resin by melting technique.

The thermoset polyurethane foam constituting the polishing layer may be produced preferably by a mechanical foaming method (examples thereof including a mechanical frothing method).

Particularly preferred is a mechanical foaming method using a silicone surfactant that is a copolymer of a polyalkylsiloxane and a polyether. Examples of a preferred compound as the silicone surfactant include SH-192 and L-5340 (manufactured by Dow Corning Toray silicone Co., Ltd.), and B8443 (manufactured by Goldschmidt GmbH).

If necessary, the following may be added (to the resin): a stabilizer such as an antioxidant, a lubricant, a pigment, a filler, an antistatic agent, and other additives.

A description will be made hereinafter about examples of a method for producing the thermoset polyurethane foam constituting the polishing layer. The following processes (1) to (3) can be given as examples of a method for producing a foam-dispersed urethane composition which is a raw material of this polyurethane foam:

(1) An isocyanate component, polyol compounds and others are caused to react with each other to prepare an isocyanate-terminated prepolymer. A silicone surfactant is added to the prepolymer to produce a first component. While the first component is mechanically stirred in the presence of a nonreactive gas, the nonreactive gas is dispersed thereinto as fine bubbles to prepare a foam-dispersed liquid. To the foam-dispersed liquid is added a second component including active-hydrogen-containing compounds such as a low-molecular-weight polyol and a low-molecular-weight polyamine, and then these components are mixed with each other to prepare a foam-dispersed urethane composition. A catalyst may be appropriately added to the second component.

(2) A silicone surfactant is added to at least one of a first component including an isocyanate component (or isocyanate-terminated prepolymer), and a second component including active-hydrogen-containing compounds, and then the component to which the silicone surfactant is added is mechanically stirred in the presence of a nonreactive gas to disperse the nonreactive gas thereinto as fine bubbles. In this way, a foam-dispersed liquid is prepared. The remnant component is added to the foam-dispersed liquid. The components therein are mixed with each other to prepare a foam-dispersed urethane composition.

(3) A silicone surfactant is added to at least one of a first component including an isocyanate component (or isocyanate-terminated prepolymer), and a second component including active-hydrogen-containing compounds, and then the first and second components are mechanically stirred in the presence of a nonreactive gas to disperse the nonreactive gas thereinto as fine bubbles to prepare a foam-dispersed urethane composition.

The foam-dispersed urethane composition may be prepared by a mechanical frothing method. The mechanical frothing method is a method of: putting raw material components into a mixing chamber of a mixing head while a nonreactive gas is incorporated thereinto; and mixing and stirring the components by means of a mixer such as an Oakes mixer, thereby making the nonreactive gas into the state of fine bubbles and further dispersing the bubbles into the raw material mixture. The mechanical frothing method is a preferred method since the method makes it possible to adjust the density of the polyurethane foam easily by the adjustment of the incorporated amount of the nonreactive gas. Moreover, the method gives a good production-efficiency since the method makes it possible to shape continuously a polyurethane foam having substantially spherical fine bubbles having an average bubble diameter of 20 to 300 μm.

Thereafter, the foam-dispersed urethane composition prepared by this method is painted onto a planar member, and then the foam-dispersed urethane composition is cured to form a thermoset polyurethane foam (polishing layer) directly onto the planar member.

The nonreactive gas used to form the fine bubbles is preferably an incombustible gas, and specific examples thereof include nitrogen, oxygen and carbon dioxide gases, rare gases such as helium and argon, and any mixed gas of two or more of these gases. The gas from which water is removed by drying is most preferred from the viewpoint of costs.

As a stirring machine for making the nonreactive gas in the form of fine bubbles, and further dispersing the bubbles, a known stirring machine may be used without especial restriction. Specific examples of the machine include a homogenizer, a Dissolver, a biaxial planetary mixer, and a mechanical frothing machine. The shape of one or more stirring vanes of the stirring machine is not particularly limited. A whipper-shaped stirring vane is preferred since the use thereof gives fine bubbles.

It is also preferred to use different stirring machines for the stirring for preparing the foam-dispersed liquid in the forming step, and for the stirring for mixing the first and second components to each other. In the mixing step, the stirring is not required to be stirring for forming bubbles, and the use of a stirring machine that does not generate large bubbles is preferred. Such a stirring machine is preferably a planetary mixer. Even when the same stirring machine is used in the foaming step of preparing the foam-dispersed liquid and the mixing step of mixing the individual components with each other, no problem is caused. It is also preferred to use the machine while stirring conditions are adjusted, for example, the rotating speed of the stirring vane(s) is adjusted as the need arises.

In the polishing pad according to the present invention, a substrate layer may be laminated on the polishing layer. When the substrate layer is laminated on the polishing layer, the substrate layer is not particularly limited. Examples thereof include nylon, polypropylene, polyethylene, polyester, polyvinyl chloride, and other plastic films; a polyurethane foam, a polyethylene foam, and other high-molecular-weight resin foams; rubbery resins such as butadiene rubber and isoprene rubber; and photosensitive resins. It is preferred to use, out of these examples, nylon, polypropylene, polyethylene, polyester, polyvinyl chloride, and other plastic films; and polyurethane foam, polyethylene foam, and other high-molecular-weight resin foams. The substrate layer may be a double-sided tape, or a single-sided adhesive tape (the single-sided adhesive layer thereof is to be bonded to a platen).

The substrate layer preferably has a hardness equal to or more than that of the polyurethane foam to give toughness to the polishing pad. The thickness of the substrate layer (when the layer is a double-sided tape or a single-sided adhesive tape, the thickness of its substrate) is not particularly limited, and is preferably from 20 to 1,000 μm, more preferably from 50 to 800 μm from the viewpoint of strength and flexibility.

Examples of the means that can be adopted to paint the foam-dispersed urethane composition onto the planar member include gravure, kiss and comma and other roll coaters; slot, fountain and other die coaters; a squeeze coater; a curtain coater; and other painting means. However, the means may be any means capable of forming a uniform painted film on the planar member.

It is highly preferable to heat the polyurethane foam obtained by painting the foam-dispersed urethane composition onto the planar member and causing the components to react with each other until the composition comes not to flow, thereby post-curing the composition since the post-curing produces an effect of improving the polyurethane foam in physical properties. The post-curing is preferably performed at 40 to 70° C. for 10 minutes to 24 hours, and this operation is also preferably performed under a normal pressure since the shape of the bubbles is stabilized.

In the production of the polyurethane foam, a tertiary amine catalyst, or any other known catalyst may be used for promoting the polyurethane reaction. The kind and the addition amount of the catalyst is selected, considering a period when a mixture yielded after the step of mixing the individual components with each other is flowing in order to be painted onto the planar member.

The polyurethane foam may be produced in a batch manner of weighing the individual components, charging the components into a container and then stirring the components mechanically, or in a continuous production manner of supplying the individual components and the nonreactive gas continuously to a stirring machine, stirring these components mechanically, feeding out the foam-dispersed urethane composition and then shaping the composition into a shaped product.

In the polishing pad manufacturing method of the present invention, it is necessary that after or while a polyurethane foam is formed onto a planar member, the polyurethane foam is adjusted into a uniform thickness. The method for adjusting the polyurethane foam into a uniform thickness is not particularly limited, and examples thereof include a method of buffing the foam with a polishing member, and a method of pressing the foam by use of a pressing plate. When the foam is buffed, a polishing layer having, on the polyurethane foam surface, no skin layer is yielded. When the foam is pressed, a polishing layer having, on the polyurethane foam surface, a skin layer is yielded. Conditions for the pressing are not particularly limited; preferably, the temperature of the foam is adjusted to the glass transition point or higher.

The foam-dispersed urethane composition prepared in the above-mentioned manner is painted onto a releasing sheet, and a substrate layer is laminated onto the foam-dispersed urethane composition. Thereafter, by curing the foam-dispersed urethane composition while a pressing means is used to make the composition into a uniform thickness, a polyurethane foam may be formed. This method is a particularly preferred method since the polishing layer can be controlled into a highly uniform thickness.

The material for forming the releasing sheet is not particularly limited, and examples thereof may be the same resins and papers for the above-mentioned substrate. The releasing sheet is preferably a sheet small in dimension change based on heat. The surface of the releasing layer may be subjected to releasing treatment.

The pressing means for making, into a uniform thickness, the sandwich sheet composed of the releasing sheet, the foam-dispersed urethane composition (foam-dispersed urethane layer) and the substrate layer is not particularly limited. For example, a coater roller, a nip roller or some other is used to compress the sandwich sheet into a constant thickness. Considering that after the compressing, the size of the bubbles in the foamed layer becomes about 1.2 to 2 times larger than that before the compressing, it is preferred at the compressing time to make "50 to 85% of the thickness of the cured polyurethane foam" equal to a value of "the clearance of the coater or the nip"–"the thickness of the substrate layer and the releasing sheet". In order to yield a polyurethane foam having a specific gravity of 0.2 to 0.5, it is preferred that the foam-dispersed urethane composition has a specific gravity of 0.24 to 1 before passed through the roll.

After the sandwich sheet is made into the uniform thickness, the polyurethane foam obtained by causing the components concerned to react with each other until the foam comes not to flow is heated to be post-cured. Conditions for the post-curing are the same as described above.

Thereafter, the releasing sheet underneath the polyurethane foam is peeled. In this case, a skin layer is being formed on the polyurethane foam. When the polyurethane foam is formed by a mechanical foaming method as described above, the unevenness of the bubbles is less generated in the upper surface side of the polyurethane foam than in the lower surface side. When the lower surface side of the thus-formed polyurethane foam is used as a polishing surface, this polishing surface is a surface wherein the unevenness of the bubbles is small. Thus, the polishing pad is made better in polishing rate stability. The skin layer may be removed by buffing the polyurethane foam after the releasing sheet is peeled.

The thickness of the polyurethane foam is not particularly limited, and is preferably from 0.2 to 3 mm, more preferably from 0.5 to 2 mm.

The polyurethane foam produced by the above-mentioned production method has substantially spherical bubbles. The polyurethane foam according to the present invention may be a foam having continuous bubbles, or a foam having independent bubbles.

The average bubble diameter of the bubbles in the polyurethane foam is from 20 to 300 µm, preferably from 50 to 100 µm. When the bubbles are continuous bubbles, the average diameter of circular openings in the surfaces of the bubbles is preferably 100 µm or less, more preferably 50 µm or less.

The specific gravity of the polyurethane foam is preferably from 0.3 to 0.9, more preferably from 0.4 to 0.5. If the specific gravity is less than 0.3, the polishing layer or pad tends to be too high in porosity so as to be deteriorated in endurance. On the other hand, if the specific gravity is more than 0.9, it is necessary to make the raw materials into a low crosslinkage density in order to make the polishing layer into a predetermined elastic modulus. In this case, the polishing pad tends to be increased in permanent strain to be deteriorated in endurance.

About the hardness of the polyurethane foam, the Asker C hardness thereof is preferably from 10 to 80 degrees, more preferably from 20 to 70 degrees. If the Asker C hardness is less than 10, the polishing pad tends to be lowered in endurance, and a matter to be polished tends to be deteriorated in flatness after polished. On the other hand, if the hardness is more than 80 degrees, the front surface of a matter to be polished is easily scratched.

The shape of the polishing pad of the present invention is not particularly limited, and may be a long strip shape having a length of about 5 to 10 m, or may be a round shape having a diameter of about 50 to 150 cm.

The front surface of the polishing layer may have a convexo-concave structure for hold/renewing a slurry. The polishing layer made of the foam has many openings at its polishing surface to have a function of holding/renewing a slurry, and when the convexo-concave structure is formed in the polishing surface, the holding and renewing of a slurry can be more effectively attained. Moreover, the structure makes it possible to prevent a matter to be polished from being broken by adsorption between the pad and the matter to be polished. The form of the convexo-concave structure is not particularly limited as far as the form holds/renews a slurry. Examples of the convexo-concave structure include X (stripe) grooves, XY lattice grooves, concentric grooves, through holes, blind holes, polygonal columns, circular columns, a spiral groove, eccentric grooves, radial grooves, and any combination of two or more of these grooves. These convexo-concave structures each generally have therein regularity. However, in order to render the structure a structure having a desired performance of holding/renewing a slurry, the structure may be changed in groove pith, groove width, groove depth or some other inside individual areas thereof.

The method for forming the convexo-concave structure is not particularly limited, and examples thereof include a method of using a tool, such as a bite having a predetermined size, to cut the polishing layer mechanically, a method of causing a resin to flow in a mold having a predetermined surface shape, and curing the resin to form the structure, a method of pressing a resin by use of a pressing plate having a predetermined surface shape to form the structure, a method of using photolithography to form the structure, a method of using a printing method to form the structure, and a method of using a laser ray, such as a carbon dioxide gas laser ray, to form the structure.

The polishing pad of the present invention may be a pad wherein a cushion sheet is bonded onto a non-polishing surface side of a polishing layer. When a substrate layer is laminated onto the polishing layer, it is preferred to laminate the polishing layer, the substrate layer, and the cushion sheet in this order.

The cushion sheet (cushion layer) is a member compensating for properties of the polishing layer. The cushion sheet is required in order to make both of planarity and uniformity, which have a tradeoff relationship with each other in chemical mechanical polishing, compatible with each other. The planarity is the following flatness at the time of polishing a matter to be polished which has fine irregularities generated when a pattern is formed in the matter: the flatness of the patterned region. The uniformity is the evenness of the whole of the matter to be polished. In accordance with properties of the polishing layer, the planarity is improved, and in accordance with properties of the cushion sheet, the uniformity is improved. In the polishing pad of the present invention, it is preferred to use, as the cushion sheet, a sheet softer than the polishing layer.

Examples of the cushion sheet include fiber nonwoven fabrics, such as a polyester nonwoven fabric, a nylon nonwoven fabric, and an acrylic nonwoven fabric; resin-impregnated nonwoven fabrics, such as a polyester nonwoven fabric into which polyurethane is impregnated; high-molecular-weight resin foams, such as a polyurethane foam, and a polyethylene foam; and rubbery resins, such as butadiene rubber and isoprene rubber; and photosensitive resins.

The means for bonding the cushion sheet is, for example, a means of sandwiching the polishing layer and the cushion layer between pieces of a double-sided tape, and then pressing the sandwich.

In the polishing pad of the present invention, a double-sided tape may be laid on the surface thereof which is to be bonded to a platen.

A semiconductor device is manufactured through a process of using the above-mentioned polishing pad to polish a surface of a semiconductor wafer. The semiconductor wafer is generally a matter wherein a wiring metal and an oxide film are laminated on a silicon wafer. The method and machine for polishing the semiconductor wafer are not particularly limited. For example, as illustrated in FIG. 1, the polishing is performed by use of a polishing machine equipped with a polishing table 2 for supporting a polishing pad 1, a supporter (polishing head) 5 for supporting a semiconductor wafer 4, a backing member for applying an even pressure to the wafer, and a mechanism for supplying a polishing agent 3. The polishing pad 1 is bonded onto the polishing pad 2 through, for example, a double-sided tape to be fitted on the pad 2. The polishing table 2 and the supporter 5 are arranged in such a manner that the polishing pad 1 and the semiconductor wafer 4 supported on these members 2 and 5, respectively, are faced to each other. The members 2 and 5 have rotating axes 6 and 7, respectively. In the vicinity of the supporter 5, a pressing mechanism is located for pushing the semiconductor wafer 4 onto the polishing pad 1. The semiconductor wafer 4 is polished by pushing the semiconductor wafer 4 onto the polishing pad 1 while the polishing table 2 and the supporter 5 are rotated, and further supplying a slurry thereto. The flow rate of the slurry is not particularly limited, as well as the load for the polishing, the rotation number of the polishing table, and the rotation number of the wafer. These are appropriately adjusted.

In this way, the surface roughness of the surface of the semiconductor wafer 4 is improved, and scratches therein are removed. Thereafter, the wafer is subjected to dicing, bonding, packaging and others to manufacture a semiconductor device. The semiconductor device is used in, for example, an arithmetic processing device, or a memory. A lens, or a glass substrate for a hard disc can be finish-polished in the same manner as described above.

EXAMPLES

Hereinafter, the present invention will be described by way of working examples. However, the present invention is not limited to these working examples.

Specific Gravity Measurement:

The measurement is made in accordance with JIS Z8807-1976. Any produced polyurethane foam is cut out into the form of a strip (thickness: selected at will) 4 cm×8.5 cm in size, and the strip is used as a sample. The sample is allowed to stand still in an environment having a temperature of 23° C.±2° C., and a humidity of 50±5% for 16 hours. The measurement is made by use of a gravimeter (manufactured by Sartorius AG). In this way, the specific gravity is measured.

Hardness Measurement:

The measurement is made in accordance with JIS K-7312. Any produced polyurethane foam is cut out into pieces 5 cm×5 cm in size (thickness: selected at will), and the pieces are used as samples. The samples are allowed to stand still in an environment having a temperature of 23° C.±2° C., and a humidity of 50%±5% for 16 hours. Some of the samples are put onto each other to give a thickness of 10 mm or more. A hardness meter (Asker C hardness meter, manufactured by Kobunshi Keiki Co., Ltd., pressing surface height: 3 mm) is used, and the pressing surface is brought into contact therewith. After 30 seconds from the contact, the hardness is measured.

Tiny Undulations:

A noncontact profilometer (New View 6300, manufactured by Zygo Corp.) is used to measure the Ra of each of five points of the front surface of a matter to be polished under conditions that the lens power is 2.5, the zooming power is 0.5, and its bandpass filter is set to 200 to 1,250 µm. The average value (nm) thereof is defined as the tiny undulations. When the tiny undulations are measured, the used polished matter is a polished matter obtained by polishing according to the following polishing manner.

Polishing Manner:
Double-sided Polisher Setting Conditions
Double-sided polisher: 9B type double-sided polisher, manufactured by SpeedFam Co., Ltd.
Processing pressure: 100 g/cm$^2$
Table rotation number: 50 rpm
Polishing agent supply rate: 4 L/min
Charged substrates: TS-10SX, manufactured by Ohara Inc.
The number of the charged substrates: 25
Each of the substrates is continuously polished until the substrate thickness is turned to 85% of the initial thickness. The used polishing agent is prepared by the following method:
Polishing Agent Preparing Method:
To water is added a product SHOROX A-10 (manufactured by Showa Denko K.K.), and these are mixed with each other to prepare a polishing agent to have a specific gravity of 1.06 to 1.09.
Raw Materials:
Individual raw materials used are as follows:
(i) Polyol Compounds
Polycaprolactone polyol "PLACCEL 210N (PCL210N)", manufactured by Daicel Chemical Industries, Ltd.; the number of functional groups: 2, and hydroxyl group value: 110 mg KOH/g, Polycaprolactone polyol "PLACCEL 305 (PCL305)" manufactured by Daicel Chemical Industries, Ltd.; the number of functional groups: 3, and hydroxyl group value: 305 mg KOH/g, Polycaprolactone polyol "PLACCEL 308 (PCL308)" manufactured by Daicel Chemical Industries, Ltd.; the number of functional groups: 3, and hydroxyl group value: 198 mg KOH/g, Polytetramethylene ether glycol "PTMG1000", manufactured by Mitsubishi Chemical Corp.; the number of functional groups: 2, and hydroxyl group value: 110 mg KOH/g, Polytetramethylene ether glycol "PTMG2000", manufactured by Mitsubishi Chemical Corp.; the number of functional groups: 2, and hydroxyl group value: 56 mg KOH/g,
Diethylene glycol (DEG), manufactured by Nacalai Tesque Inc.; the number of functional groups: 2, and hydroxyl group value: 1,057 mg KOH/g,
1,4-butanediol (1,4-BD), manufactured by Nacalai Tesque Inc.; the number of functional groups: 2, and hydroxyl group value: 1,247 mg KOH/g,
Propylene oxide adduct of trimethylolpropane "EXCENOL 890 MP", manufactured by Asahi Glass Co., Ltd.; the number of functional groups: 3, and hydroxyl group value: 865 mg KOH/g,
Diglycerin, manufactured by Wako Pure Chemical Industries, Ltd.; the number of functional groups: 4, and hydroxyl group value: 1,350 mg KOH/g,
(ii) Monool Compounds
Diethylene glycol monoethyl ether (EtODEG), manufactured by Nacalai Tesque Inc.; the number of functional group: 1, and hydroxyl group value: 418 mg KOH/g,
Diethylene glycol monomethyl ether (MeODEG), manufactured by Nacalai Tesque Inc.; the number of functional group: 1, and hydroxyl group value: 467 mg KOH/g,
(iii) Catalyst
"Kao No. 25", manufactured by Kao Corp.
(iv) Foaming Agent
"B8443", manufactured by Goldschmidt GmbH
(v) Isocyanate Component
Carbodiimide-modified diphenylmethane diisocyanate (MDI) "MILLIONATE MTL", manufactured by Nippon Polyurethane Industry Co., Ltd.

Examples 1 to 6, and Comparative Example 1

Individual raw materials were charged into a container to give blend proportions in the upper columns in Table 1 (each of numbers therein represents the number of parts by weight of one of the raw materials when the total amount of the polyol compounds is regarded as 100 parts by weight), and stirring vanes were used to stir the blended components vigorously at a rotation number of 900 rpm for 4 minutes to take bubbles into the reaction system. Thereafter, the carbodiimide-modified MDI was added thereto to give an NCO index of 1.10, and the reaction system was stirred for 1 minute to prepare each foam-dispersed urethane composition.

The prepared foam-dispersed urethane composition was painted onto a releasing sheet that was a PET sheet (manufactured by Toyobo Co., Ltd.; thickness: 75 µm) subjected to releasing treatment to form a foam-dispersed urethane layer. The foam-dispersed urethane layer was covered with a substrate layer that was a PET sheet (manufactured by Toyobo Co., Ltd., thickness: 188 µm). A nip roll was used to make the foam-dispersed urethane layer into a thickness of 1.5 mm, and the workpiece was primarily cured at 40° C. for 30 minutes. Thereafter, the workpiece was secondly cured at 70° C. for 30 minutes to form a polyurethane foam (foamed layer). Thereafter, the releasing sheet was peeled. Next, a slicer (manufactured by Fecken-Kirfel Gmbh & Co.) was used to make the polyurethane foam into a thickness of 1.3 mm. In this way, the precision of the thickness was adjusted. Thereafter, a laminator was used to bond a double-sided tape (Double Tack Tape, manufactured by Sekisui Chemical Co., Ltd.) onto the front surface of the substrate layer to manufacture a polishing pad.

the active-hydrogen-containing compounds comprise one or more polyol compounds, each of which has two or more functional groups, and a monool compound having one functional group, and the monool compound is a compound represented by the following general formula (1):

$$R1-(OCH_2CHR2)_n-OH \quad (1)$$

wherein R1 is a methyl or ethyl group, R2 is a hydrogen atom, or a methyl group, and n is an integer of 1 or 2, and the thermoset polyurethane foam has substantially spherical bubbles having an average bubble diameter of 20 to 300 µm.

2. The polishing pad according to claim 1, wherein the monool compound is contained in an amount of 1 to 20 parts by weight for 100 parts by weight of the polyol compound(s).

3. The polishing pad according to claim 1, wherein one or more polyol compounds, each of which has 3 or 4 functional groups and a hydroxyl group value of 100 to 1,900 mg KOH/g, are comprised in an amount of 20 to 75 parts by weight for 100 parts by weight of the polyol compounds.

4. The polishing pad according to claim 1, wherein the isocyanate component is an aromatic isocyanate.

5. The polishing pad according to claim 1, wherein the isocyanate component is a carbodiimide-modified diphenylmethane diisocyanate.

6. A method for manufacturing a polishing pad, comprising:

TABLE 1

| | | The number of functional group(s) | Hydroxyl group value (mg KOH/g) | Example 1 | Example 2 | Example 3 | Comparative Example 1 | Example 4 | Example 5 | Example 6 |
|---|---|---|---|---|---|---|---|---|---|---|
| Polyol compounds | PCL210N | 2 | 110 | — | — | — | — | 65 | 65 | — |
| | PTMG1000 | 2 | 110 | — | — | — | — | — | — | 20 |
| | PTMG2000 | 2 | 56 | 45 | 45 | 45 | 45 | — | — | — |
| | PCL305 | 3 | 305 | 40 | 40 | 40 | 40 | 20 | 20 | — |
| | PCL308 | 3 | 198 | — | — | — | — | — | — | 68 |
| | DEG | 2 | 1057 | 13 | 13 | 13 | 13 | 13 | 13 | — |
| | 1,4-BD | 2 | 1247 | — | — | — | — | — | — | 10 |
| | 890MP | 3 | 865 | 2 | 2 | 2 | 2 | 2 | 2 | — |
| | Diglycerin | 4 | 1350 | — | — | — | — | — | — | 2 |
| Monool compounds | EtODEG | 1 | 418 | 5 | 10 | 15 | — | 10 | — | 10 |
| | MeODEG | 1 | 467 | — | — | — | — | — | 10 | — |
| Catalyst | Kao No. 25 | | | 0.05 | 0.05 | 0.05 | 0.05 | 0.02 | 0.02 | 0.04 |
| Foaming agent | B8443 | | | 6 | 6 | 6 | 6 | 6 | 6 | 6 |
| NCO INDEX | | | | 1.10 | 1.10 | 1.10 | 1.10 | 1.10 | 1.10 | 1.10 |
| Specific gravity | | | | 0.47 | 0.46 | 0.53 | 0.49 | 0.47 | 0.49 | 0.51 |
| Hardness (C hardness) | | | | 80 | 75 | 72 | 88 | 65 | 68 | 72 |
| Tiny undulations (nm) | | | | 0.29 | 0.27 | 0.24 | 0.34 | 0.26 | 0.27 | 0.30 |

It is understood from the results in Table 1 that each of the polishing pads of Examples 1 to 6 was reduced in tiny undulations generated in the surface of the matter to be polished as compared with the polishing pad of Comparative Example 1.

The invention claimed is:

1. A polishing pad having a polishing layer comprising a thermoset polyurethane foam, wherein the thermoset polyurethane foam contains, as raw material components, an isocyanate component, and active-hydrogen-containing compounds, and the step of using a mechanical foaming method to prepare a foam-dispersed urethane composition containing, as raw material components, active-hydrogen-containing compounds comprising a polyol compound having two or more functional groups and a monool compound having one functional group, and an isocyanate component;

wherein the monool compound is a compound represented by the following general formula (1):

$$R1-(OCH_2CHR2)_n-OH \quad (1)$$

R1 being a methyl or ethyl group, R2 is a hydrogen atom, or a methyl group, and n is an integer of 1 or 2, the step of painting the foam-dispersed urethane composition onto a planar member;

the step of setting the foam-dispersed urethane composition to form a polishing layer comprising a thermoset polyurethane foam having substantially spherical bubbles having an average bubble diameter of 20 to 300 µm;

and the step of adjusting the polishing layer into a uniform thickness.

7. A method for manufacturing a semiconductor device, comprising the step of using the polishing pad recited in claim 1 to polish a surface of a semiconductor wafer.

8. The polishing pad according to claim 1, wherein a molecular weight of the monool compound is smaller than or equal to the molecular weight of diethylene glycol monoethyl ether.

* * * * *